Patented July 11, 1933

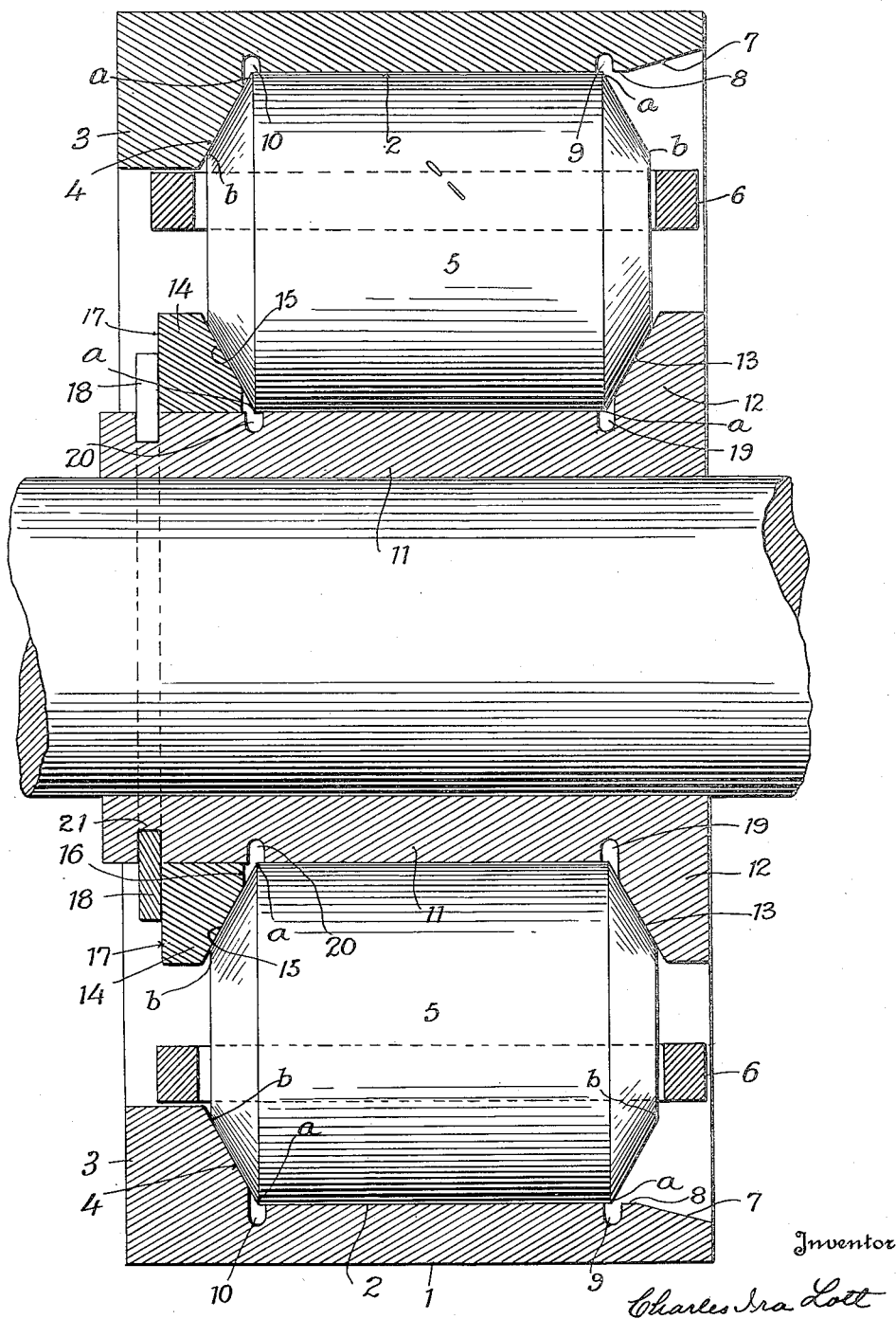

1,917,452

UNITED STATES PATENT OFFICE

CHARLES IRA LOTT, OF DU BOIS, PENNSYLVANIA, ASSIGNOR OF SIXTY PER CENT TO W. G. BROWN AND W. W. MILLIRON, BOTH OF DU BOIS, PENNSYLVANIA

ROLLER BEARING

Application filed December 2, 1929. Serial No. 411,034.

My invention relates to roller bearings of the type employing an outer race ring having a flange at one end, an inner race ring also having a flange at one end and caged, conical-ended rollers held on the inner race ring by a snap or locking ring, so as to take both radial and axial thrust loads.

The failure of roller bearings of this type is mainly due to breaking of the corners of the rollers where the conical end surfaces meet the periphery of these corners of the rollers, the metal broken off getting between the rollers and their cylindrical raceways. These loose chips from the corners cut the rollers and cylindrical raceways, cause pounding, and the rapid wear and breaking up of the bearing.

The object of my invention is to prevent this, and I do it by preventing the outer corners of the rollers from contacting with the metal, which I do by constructing the outer or inner, but preferably both races with grooves over which the corners of the rollers project and ride, without contact with metal.

In the accompanying drawing,

The outer race 1 has a cylindrical race surface 2, and at one end a flange 3 having a conical thrust ring surface 4. The rollers 5 have conical ends and any suitable cage, as 6. The other end of the outer race ring 1 has a slightly bevelled guide surface 7, to facilitate assembly with a short cylindrical land 8 of the same diameter as race surface 2.

Said outer race ring 1 also has at each end of the cylindrical race surface grooves 9 and 10 the width of which extends a substantial distance along both the cylindrical and conical surfaces of the race, and over which project the outer corners $a$ of the rollers, which ride out of contact with any metal, thus relieving these corners $a$ of any load whatever, in any lateral position of the rollers with respect to the raceways.

The hardened steel rollers 5 have usually a lateral play in the race rings of a few thousandths of an inch, and also a similar radial play, although for some particular apparatus an axial or lateral play may be required of one-sixteenth of an inch or more, according to requirements. This permits a slight tipping of the longitudinal axes of the rollers, so that their outer corners wear into the metal of the raceways and break off on heavy axial thrust.

By relatively dimensioning the length of the cylindrical wearing surface of the rollers and the distance apart of the grooves 9 and 10, and the width of these grooves, I produce a roller bearing in which the outer corners $a$ of the conical ends of the rollers never touch a metal surface under any conditions of operation.

The inner race ring 11, is similarly made. It has a flange 12 at one end provided with an internal bevel 13 forming a conical surface and a loose ring 14 having a bevel 15 and a short face 16 parallel with the outer face 17. A split locking ring 18 seating in a groove 21 holds the thrust ring 14 in place.

Grooves 19 and 20 are formed in the inner race ring 11, for the same purpose as grooves 9 and 10 and lie in the planes thereof respectively. The conical surface 15 of the ring 14 shall not come to a sharp or acute angled edge, to prevent edge engagement with the outer corner $a$ of the rollers, and for this reason I provide the short face 16 parallel with the short face on the flange.

The flanges 3 and 12, and the ring 14 project beyond the inner corners $b$ of the rollers, to prevent the inner edges of these flanges and ring from wearing a groove in the conical faces of the rollers.

The thickness of the two flanges 3 and 13 extending from their respective grooves 10 and 19 is preferably the same, so that either end of the inner race ring, with the rollers mounted thereon, can be inserted into the outer race ring.

I am aware that it has heretofore been the practice to place a groove in the angle between the face of a flange and a cylindrical raceway to facilitate grinding and prevent the corner of the grinding wheel from breaking off and unduly wearing at its edge, as, for instance, is shown in my Patent No. 1,533,746, dated April 14, 1925.

No particular attention has ever been paid to so dimensioning the rollers that their outer corners shall ride over grooves in the races, free of contact with metal.

Therefore, I believe that I am the first to provide a groove at each end of the rollers of a roller bearing to prevent the outer corners of the rollers from contacting with the metal, and this immaterial whether only one set or a plurality of sets of rollers, such as two or three sets of rollers, are used in the same bearing.

I claim:

In a roller bearing adapted to operate under a substantial axial thrust, inner and outer cylindrical race rings forming a raceway for rollers, each of said race rings being provided with a flange at one end extending inwardly in said raceway, said flanges having conical surfaces adjacent the rollers, a plurality of rollers in said raceway, each having a cylindrical portion and conical ends, the cylindrical portions contacting with the cylindrical race rings and the conical ends contacting with the conical surfaces of the flanges, the race rings and their flanges having portions cut away at their junction forming annular grooves adjacent the junction of the cylindrical and conical portions of the rollers, whereby said junction of the rollers is free of contact with the race rings under all conditions of operation.

In testimony that I claim the foregoing as my invention, I have signed my name hereto.

CHARLES IRA LOTT.